United States Patent [19]

Gueldner

[11] 4,076,435
[45] Feb. 28, 1978

[54] MECHANICAL DECOUPLER

[76] Inventor: Howard C. Gueldner, 237 Barcelona, New Braunfels, Tex. 78130

[21] Appl. No.: 737,117

[22] Filed: Oct. 29, 1976

[51] Int. Cl.² ............................................. F16B 21/16
[52] U.S. Cl. .................................... 403/322; 403/325; 244/3
[58] Field of Search ............... 403/322, 325, 330, 317, 403/11, 12, 16, 33, 164, 165; 294/83 R, 93, 94, 96; 244/1 R, 3, 122 AB, 122 AC, 122 AD, 131, 158, 161; 180/14.5; 280/504

[56] References Cited

U.S. PATENT DOCUMENTS

| 2,662,712 | 12/1953 | Rose .................................. 403/325 X |
| 3,469,872 | 9/1969 | Damm et al. ........................ 403/325 |
| 3,608,935 | 9/1971 | Hodapp ............................ 403/325 X |
| 3,738,693 | 6/1973 | Loustalet ......................... 403/322 X |

Primary Examiner—Wayne L. Shedd
Attorney, Agent, or Firm—Joseph E. Rusz; Arsen Tashjian

[57] ABSTRACT

An apparatus for automatically decoupling two bodies that are coupled and are under a tension load. Unlike the prior art, the decoupling is actuated and accomplished entirely mechanically, and without the use of any explosives; and, the apparatus is reusable.

9 Claims, 1 Drawing Figure

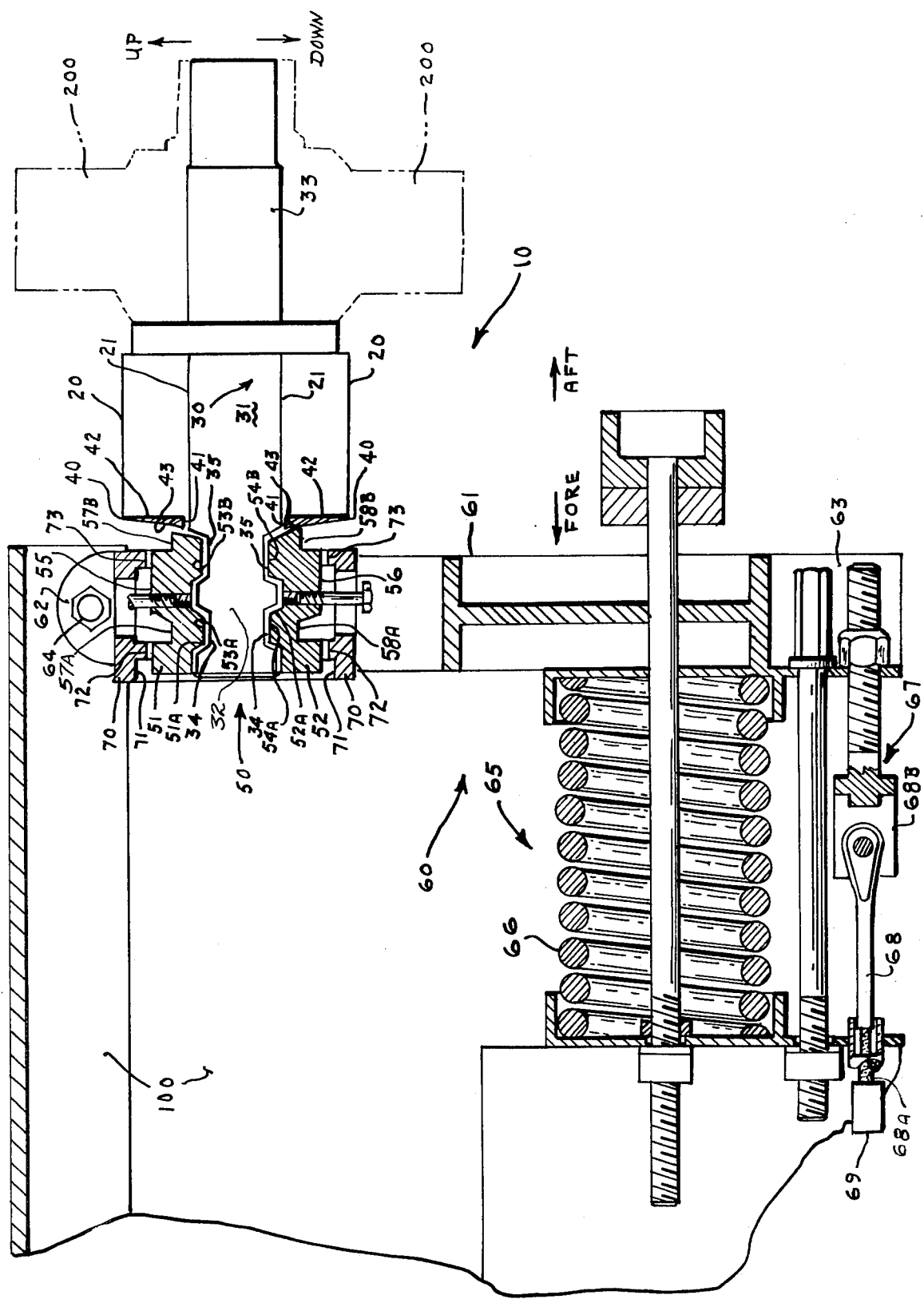

MECHANICAL DECOUPLER

STATEMENT OF GOVERNMENT INTEREST

The invention described herein may be manufactured and used by or for the Government for governmental purposes without the payment of any royalty thereon.

BACKGROUND OF THE INVENTION

This invention relates to a coupling-decoupling apparatus and, more particularly, to a reusable mechanical apparatus for coupling a first body and a second body, and for automatically decoupling, by non-explosive means, the coupled first and second bodies while they are under a tension load.

Coupling and decoupling (i.e., uncoupling) apparatuses are well known. Equally well known is the fact that is is conventional to decouple two coupled bodies, that are under a tension load, by using explosive means. The two obvious and major disadvantages of known prior art decouplers are: the decoupler is not reusable (i.e., it is blown to bits by the explosive); and, the explosives used, and the resulting flying exploded bits of decoupler, are per se inherently dangerous.

My inventive non-explosive, reusable coupler-decoupler (hereinafter referred to as my "mechanical decoupler") obviates these long-standing disadvantages of the prior art; and, thereby, significantly advances the state-of-the-art.

SUMMARY OF THE INVENTION

This invention pertains to a mechanical decoupler.

An object of this invention is to teach the structure of a preferred embodiment of the inventive mechanical decoupler.

Another object of this invention is to permit the decoupling of two coupled bodies, under a tension load, without the use of any explosives.

Still another object of this invention is to provide a reusable mechanical coupler.

These objects, and other related objects, of this invention will become readily apparent after a consideration of the description of the invention, together with reference to the contents of the drawing.

DESCRIPTION OF THE DRAWING

The drawing is a side elevation view, partially schematic, partially pictorial, partially in cross section, partially fragmented, and in simplified form, of a preferred embodiment of my inventive mechanical decoupler.

DESCRIPTION OF THE PREFERRED EMBODIMENT

With reference to the drawing, shown therein in simplified form and principally in cross section is a side elevation view of a preferred embodiment 10 of my inventive decoupler. To better orient and assist the reader the directional designations "fore" (i.e., forward), "aft" (i,e, rearward), "up" and "down" are shown, together with their respective arrows.

As shown in the drawing, the preferred embodiment 10 comprises: a load-carrying (i.e., load-bearing) component 20, connected to the second body 100 to be coupled and decoupled with the load-carrying component 20 having an opening 21 therein and therethrough; means (generally designated 30), connected to the second body 200 to be coupled to and be decoupled from first body 100, for passing through the opening 21 in the load-carrying component 20, with the means 30 including a shaft (hereinafter referred to as a "probe") 31 that is dimensioned and is configurated to enter into and pass through the opening 21 in the load-carrying component 20; a release plate 40 having an opening 41 therein and therethrough, with the release plate 40 disposed so that the opening 41 surrounds the probe 31, and with the release plate 40 abutting the load-carrying component 20; means (generally designated 50) for transmitting and carrying a tension load from the probe 31 to the release plate 40 and, thereby, to the load-carrying component 20; means (generally designated 60) for releasably engaging and holding the probe 31, with this means 60 pivotally connected to the first body 100; and, an interface element 70 interposed between the means 60 for releasably holding the probe 31 and the means 50 for transmitting and carrying the tension load (from the probe 31 to the release plate 40 and to the load-carrying component 20).

More specifically, and as can be seen in the drawing:

The probe 31 has a first end 32 and a second end 33, with the first end 32 having a plurality of peripheral notches, grooves, or the like (preferably two of them), such as representative ones 34 and 35, and with the second end 33 connected to the second body 200.

The means 60 for releasably engaging and holding the probe 31 also includes: a lever-arm like element (generally designated 61) having a first end 62 and a second end 63, with the first end 62 pivotally connected by suitable means, such as pivot 64, to the first body 100; means 65 for biasing the second end 63 of the lever-arm like element 61, with such means 65 preferably including or consisting of a spring, such as 66; and, means (generally designated 67) for releasably securing the biasing means 65, with such means 67 preferably including a taut cable 68 having a first end 68A and a second end 68B, with the second end 68B connected (by suitable means, such as the nut-and-bolt assembly shown) to the lever-arm like element 61, preferably at the second end 63 thereof, and with the first end 68A of the taut cable 68 connected to the first body 100 and remotely and selectively disconnectable from the first body 100 by suitable conventional means, generally designated 69.

The means 50 for transmitting and carrying a tension load from the probe 31 to the release plate 40 and, thereby, to the load-carrying component 20 includes a plurality (preferably two) of wedge-shaped elements, such as representative ones 51 and 52, with each of the wedge-shaped elements having an internal surface (such as 51A for element 51 and 52A for element 52) with a plurality (preferably two) of protrusions (such as 53A and 53B for surface 51A of element 51, and 54A and 54B for surface 52A of element 52) projecting therefrom that are complementary to and are mating with the peripheral notches 34 and 35 in the first end 32 of probe 31 (e.g., protrusions 53A and 54A are complementary to and mate with, peripheral notch 34). It is to be noted that each of the wedge-shaped elements, such as 51 and 52, also have respective external surfaces 55 and 56, with each of these external surfaces having a plurality (preferably two) of notches (such as representative ones 57A and 57B for surface 55, and 58A and 58B for surface 56).

The release plate 40 has an aft surface 42 and a rearwardly inclined fore (i.e., front) surface 43, with the fore surface 43 abutting with the wedge-shaped elements 51 and 52 of the tension load transmitting and carrying means 50, and with the aft surface 42 abutting the load-carrying component 20.

It is here to be noted that the first end 62 of the lever arm-like element 61 of the means 60 for releasably engaging and holding the probe 31 houses, and is connected to, the interface element 70.

That interface element 70 preferably is annular-shaped, has an internal surface 71 with a plurality (preferably two) of protrusions, such as representative ones 72 and 73, that are complimentary, respectively, to the notches 57A and 58A (for protrusion 72) and notches 57B and 58B (for protrusion 73) on the external surfaces 55 and 56 of wedge-shaped elements 51 and 52. Additionally, the interface element 70 is slidably movable in an aft direction at (and with) a selective aft movement of the lever arm-like element 61.

MANNER OF OPERATION OF THE PREFERRED EMBODIMENT

Assuming that the first body (the forwardly disposed body) 100 and the second body (the rearwardly disposed body) 200 are coupled as shown in the drawing and are under a tension load (e.g., the first body 100 is pulling the second body 200, or second body 200 is pushing first body 100), then the manner of operation (i.e., the non-explosive, automatic decoupling) of my inventive preferred embodiment 10 can be ascertained very easily by a person of ordinary skill in the art from the foregoing description, together with reference to the contents of the drawing.

For others, it is sufficient to say in explanation that, while the bodies 100 and 200 are coupled as shown and are under a tension load, the first end 68A of the taut cable 68 is released remotely by the use of means 69, thereby slackening cable 68. This causes spring 65 to move lever arm-like element 61 aft (i.e., to the reader's right), so that the element 61 pivots around pivot 64. The further and farther aft pivotal moment of element 61 causes the interface element 70 to move aft (i.e., to the reader's right), so that the protrusions 72 and 73 are in alignment with the complimentary notches 57A and 58A, and 57B and 58B, of wedge-shaped elements 51 and 52. Simultaneously, the tension load is removed or released by suitable means, thereby causing the wedge-shaped elements 51 and 52 to move out of peripheral notches 34 and 35 of probe 31 and to ride up on and along the rearwardly inclined fore surface 43 of the release plate 40, and thereby releasing probe 31 and decoupling bodies 100 and 200.

CONCLUSION

It is abundantly clear from all of the foregoing, and from the contents of the drawing, that the sated desired objects, and other objects (such as low cost of manufacture, relative structural simplicity, compactness, and light weight), of my invention have been attained.

It is to be noted that, although there have been described the fundamental and unique features of my invention as applied to a particular preferred embodiment, various other embodiments, adaptations, substitutions, additions, omissions, and the like, may occur to, and can be made by, those of ordinary skill in the art, without departing from the spirit of my invention.

What is claimed is:

1. A reusable mechanical apparatus for coupling and automatically decoupling a first body and a second body, wherein the automatic decoupling is accomplished while said first and second bodies are under a tension load, and wherein said reusable mechanical apparatus is actuated for decoupling of said first and second bodies by non-explosive means, comprising:
   a. a load-carrying component, connected to said second body, with said load-carrying component having an opening therein and therethrough;
   b. means, connected to said second body, for passing through the opening in said load-carrying component, wherein said means includes a probe dimensioned and configured to enter into and pass through the opening in said load-carrying component;
   c. a release plate having an opening therein and therethrough, with said release plate disposed so that the opening surrounds said probe, and with said release plate abutting said load-carrying component;
   d. means for transmitting and carrying a tension load from the probe of said release plate and, thereby, to said load-carrying component;
   e. means, pivotally connected to said first body, for releasably engaging and holding the probe, wherein said means includes:
      (1) a lever arm-like element having a first end and a second end, with the first end pivotally connected to said first body;
      (2) means for biasing the second end of said lever arm-like element;
      (3) and, means for releasably securing said biasing means in a biased condition;
   f. and, an interface element interposed between said means for releasably engaging and holding the probe and said means for transmitting and carrying a tension load from the probe to said release plate and to said load-carrying component.

2. A reusable mechanical apparatus, as set forth in claim 1, wherein the probe of said means for passing through the opening in said load-carrying component has a first end and a second end, with said first end having a plurality of peripheral notches therein.

3. A reusable mechanical apparatus, as set forth in claim 2, wherein said means for transmitting and carrying a tension load from the probe to said release plate includes a plurality of wedge-shaped elements, with each of the wedge-shaped elements having an internal surface with a plurality of protrusions complementary to and mating with the peripheral notches in the first end of the probe, and with each of the wedge-shaped elements having an external surface with a plurality of notches therein.

4. A reusable mechanical apparatus, as set forth in claim 3 wherein said release plate has an aft surface and a rearwardly inclined fore surface, with said fore surface abutting with the wedge-shaped elements of the tension load transmitting and carrying means, and with the aft surface abutting said load-carrying component.

5. A reusable mechanical apparatus, as set forth in claim 4, wherein the first end of said means for releasably holding the probe houses, and is connected to, said interface element.

6. A reusable mechanical apparatus, as set forth in claim 5, wherein said interface element is annular-shaped, has an internal surface with a plurality of protrusions complementary to the notches on the external surfaces of the wedge-shaped elements, and is slidably movable in an aft direction at and with a selective aft movement of the lever arm-like element of said means for releasably holding the probe, whereby with such an aft movement of said lever arm-like element, the protrusions on the internal surface of the interface element mate with the complementary notches on the external surface of the wedge-shaped elements, thereby moving the wedge-shaped elements in an aft direction, and thereby causing the wedge-shaped elements to move along, and ride on, the rearwardly inclined fore surface of the release plate and away from the probe, whereby the probe and the second body to which it is attached are automatically decoupled.

7. A reusable mechanical apparatus, as set forth in claim 6, wherein the biasing means of said means for releasably holding the probe is a spring.

8. A reusable mechanical apparatus, as set forth in claim 7, wherein the means for releasably securing the spring in a biased condition includes: a taut cable having a first end and a second end, with the second end connected to the lever arm-like element, and with the first end connected to said first body and remotely and selectively disconnectable from the first body, whereby when said first end is disconnected, said taut cable becomes slack.

9. A reusable mechanical apparatus, as set forth in claim 8, wherein:
  a. the plurality of peripheral notches in the first end of said probe consists of two peripheral notches;
  b. the plurality of wedge-shaped elements of said means for transmitting and carrying a tension load from the probe to the release plate consists of two wedge-shaped elements;
  c. the plurality of protrusions on the internal surface of each of said wedge-shaped elements consists of two protrusions;
  d. the plurality of notches in the external surface of each of said wedge-shaped elements consists of two notches;
  e. and, the plurality of protrusions on the internal surface of said interface element consists of two protrusions.

* * * * *